United States Patent
Li et al.

(10) Patent No.: US 11,157,542 B2
(45) Date of Patent: Oct. 26, 2021

(54) SYSTEMS, METHODS AND COMPUTER PROGRAM PRODUCTS FOR ASSOCIATING MEDIA CONTENT HAVING DIFFERENT MODALITIES

(71) Applicant: Spotify AB, Stockholm (SE)

(72) Inventors: Bochen Li, Rochester, NY (US); Aparna Kumar, New York, NY (US)

(73) Assignee: SPOTIFY AB, Stockholm (SE)

( * ) Notice: Subject to any disclaimer, the term of this patent is extended or adjusted under 35 U.S.C. 154(b) by 141 days.

(21) Appl. No.: 16/439,626

(22) Filed: Jun. 12, 2019

(65) Prior Publication Data
US 2020/0394213 A1  Dec. 17, 2020

(51) Int. Cl.
| | | |
|---|---|---|
| *G06F 16/438* | (2019.01) | |
| *G06F 16/65* | (2019.01) | |
| *G06K 9/62* | (2006.01) | |
| *G06K 9/00* | (2006.01) | |
| *G06F 16/632* | (2019.01) | |
| *G06F 16/906* | (2019.01) | |
| *G06F 16/908* | (2019.01) | |
| *G06N 3/08* | (2006.01) | |
| *G06F 16/68* | (2019.01) | |

(52) U.S. Cl.
CPC .......... *G06F 16/438* (2019.01); *G06F 16/634* (2019.01); *G06F 16/65* (2019.01); *G06F 16/68* (2019.01); *G06F 16/906* (2019.01); *G06F 16/908* (2019.01); *G06K 9/00335* (2013.01); *G06K 9/6248* (2013.01); *G06N 3/08* (2013.01)

(58) Field of Classification Search
CPC .... G06F 16/483; G06F 16/683; G06F 16/783; G06F 16/7837; G06F 16/784
See application file for complete search history.

(56) References Cited

U.S. PATENT DOCUMENTS

| | | | |
|---|---|---|---|
| 2011/0282878 A1* | 11/2011 | Bird .................. | G06F 16/374 707/740 |
| 2013/0031107 A1* | 1/2013 | Pan .................. | G06F 16/435 707/749 |
| 2013/0251340 A1 | 9/2013 | Jiang et al. | |

(Continued)

FOREIGN PATENT DOCUMENTS

KR    10-2015-0092591 A    8/2015

OTHER PUBLICATIONS

Wikipedia, Sound design, Apr. 23, 2019, accessed at https://en.wikipedia.org/w/index.php?title=Sound_design&oldid=893812306 (Year: 2019).*

(Continued)

*Primary Examiner* — William Spieler
(74) *Attorney, Agent, or Firm* — Merchant & Gould P.C.

(57) ABSTRACT

Systems, methods, and computer program products for associating a media content clip(s) with other media content clip(s) having a different modality by determining first embedding vectors of media content items of a first modality, receiving a media content clip of a second modality, determining a second embedding vector of the media content clip of the second modality, ranking the first embedding vectors based on a distance between the embedding vectors and the second embedding vector, and selecting one or more of the media content items of the first modality based on the ranking, thereby pairing media content clips based on emotion.

20 Claims, 10 Drawing Sheets

(56) References Cited

U.S. PATENT DOCUMENTS

| | | |
|---|---|---|
| 2015/0286874 A1 | 10/2015 | Burghouts |
| 2016/0004911 A1 | 1/2016 | Cheng et al. |
| 2018/0032846 A1 | 2/2018 | Yang et al. |
| 2019/0267042 A1* | 8/2019 | Leekley ................. G11B 27/10 |
| 2020/0349387 A1* | 11/2020 | Krishnamurthy ...... G06N 20/10 |
| 2020/0349975 A1* | 11/2020 | Krishnamurthy .. G06K 9/00711 |

OTHER PUBLICATIONS

Guo, H. et al., "Action Extraction in Continuous Unconstrained Video for Cloud-Based Intelligent Service Robot," IEEE Special Section on Cloud-Based Robotic Systems for Intelligent Services, vol. 6, pp. 33460-33471 (2018).

* cited by examiner

| Category | Sample Video | | | | Retrieval Score (%) |
|---|---|---|---|---|---|
| Friends | 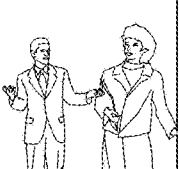 |  |  |  | 80.0 |
| Food | 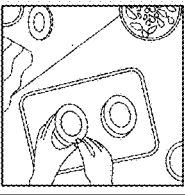 | 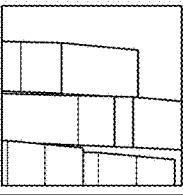 | 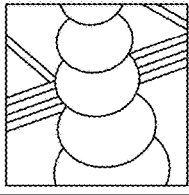 | 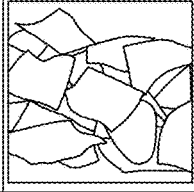 | 60.0 |
| Gadget | 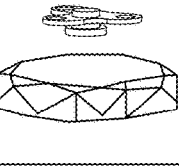 | 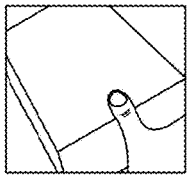 | 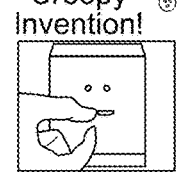 | 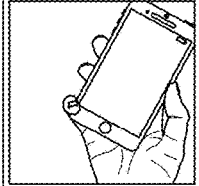 | 55.0 |
| Pet |  |  |  | 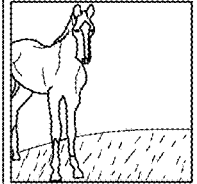 | 45.0 |
| Activity |  |  |  | 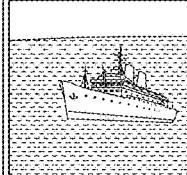 | 85.0 |
| Selfie | 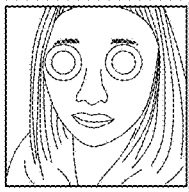 | 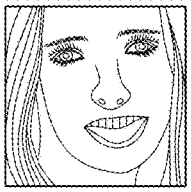 |  | 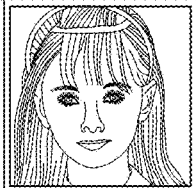 | 65.0 |
| Fashion |  | 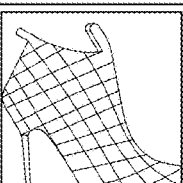 |  |  | 65.0 |
FIG. 9

SYSTEMS, METHODS AND COMPUTER PROGRAM PRODUCTS FOR ASSOCIATING MEDIA CONTENT HAVING DIFFERENT MODALITIES

BACKGROUND

Mobile devices and social media provide mechanisms that allow people to share moments from their lives and environments to the world. A mobile moment is generally known as an occasion in which a mobile device is used to capture an image, a video, sound and the like, at a particular instance in time. The media content captured during such mobile moments can be shared by, for example, posting them on social media platforms. Oftentimes, the media content is visual (e.g., a photo image or video of a product, food, or a scene). Sometimes the media content includes sound. The media content captured can be mixed with additional, third-party content (audio, video, or both, e.g., audiovisual). Adding third party content, however, is generally considered too time consuming and computer resource intensive due to the significant amount of input required to effect the mixing, display and/or playback the mixed content, among other processor and power hungry tasks.

While services exist that are used to capture media content and later pair it with third party media content, there is currently no known technical solution that can reduce the processing computations, memory allocation, and power required to receive and process the input associated with pairing content or audio clips to the captured media content among other processing tasks.

One technical problem with doing so involves pairing media content, such as music with a captured media content, such as a video. One known technique for retrieving sounds based on video content is disclosed in US 2016/0004911, which discloses a method that retrieves an audio sound that best matches a semantic object in, for example, an image retrieved from the video. Another known technique is disclosed in US2015/0286874, which discloses a method of detecting human actions from video data. Yet another known technique is disclosed in US 2013/0251340, which determines a semantic concept classification for a digital video clip.

SUMMARY

The present disclosure provides methods, apparatuses, and computer-readable products for associating at least one media content clip with another media content clip having a different modality.

In a first aspect, a method of associating at least one media content clip with another media content clip having a different modality is described. The method includes the steps of: determining a plurality of first embedding vectors of a plurality of media content items of a first modality; receiving a media content clip of a second embedding vector of the media content clip of the second modality; ranking the plurality of first embedding vectors based on a distance between the plurality of first embedding vectors and the second embedding vector; and selecting one or more of the plurality of media content items of the first modality based on the ranking.

In an example, the first modality is an auditory modality and the second modality is a visual modality. In another example, the first modality is a visual modality and the second modality is an auditory modality. For example, the audio modality is music, and the visual modality is obtained from any one of a movie, television program, photo, a single frame of a video, or a combination thereof.

The model used to associate at least one media content clip with another media content clip having a different modality is trained by constraining a stream of video with a plurality of predetermined tags for the first modality and constraining a stream of audio with a plurality of predetermined tags for the second modality. In an example, the one or more predetermined tags are used to represent an emotion. In a further example, the emotions are selected from a set of predetermined emotions.

In another aspect, a system configured to associate at least one media content clip with another media content clip having a different modality is described. The system includes a computing system including a programmable circuit operatively connected to a memory, the memory storing computer-executable instructions which, when executed by the programmable circuit, cause the computing system to perform the following steps: determine a plurality of first embedding vectors of a plurality of media content items of a first modality; receive a media content clip of a second embedding vector of the media content clip of the second modality; rank the plurality of first embedding vectors based on a distance between the plurality of first embedding vectors and the second embedding vector; and select one or more of the plurality of media content items of the first modality based on the ranking.

In an example, the first modality is an auditory modality and the second modality is a visual modality. In another example, the first modality is a visual modality and the second modality is an auditory modality. For example, the audio modality is music, and the visual modality is obtained from any one of a movie, television program, photo, a single frame of a video, or a combination thereof.

The model used to associate at least one media content clip with another media content clip having a different modality is trained by constraining a stream of video with a plurality of predetermined tags for the first modality and constraining a stream of audio with a plurality of predetermined tags for the second modality. In an example, the one or more predetermined tags are used to represent an emotion. In a further example, the emotions are selected from a set of predetermined emotions.

BRIEF DESCRIPTION OF THE DRAWINGS

Various embodiments will be described in detail with reference to the following drawings, wherein like reference numerals represent like parts and assemblies throughout the several views.

FIG. 9 illustrates a chart of an audio retrieval score for selected videos.

DETAILED DESCRIPTION

Figure 1:
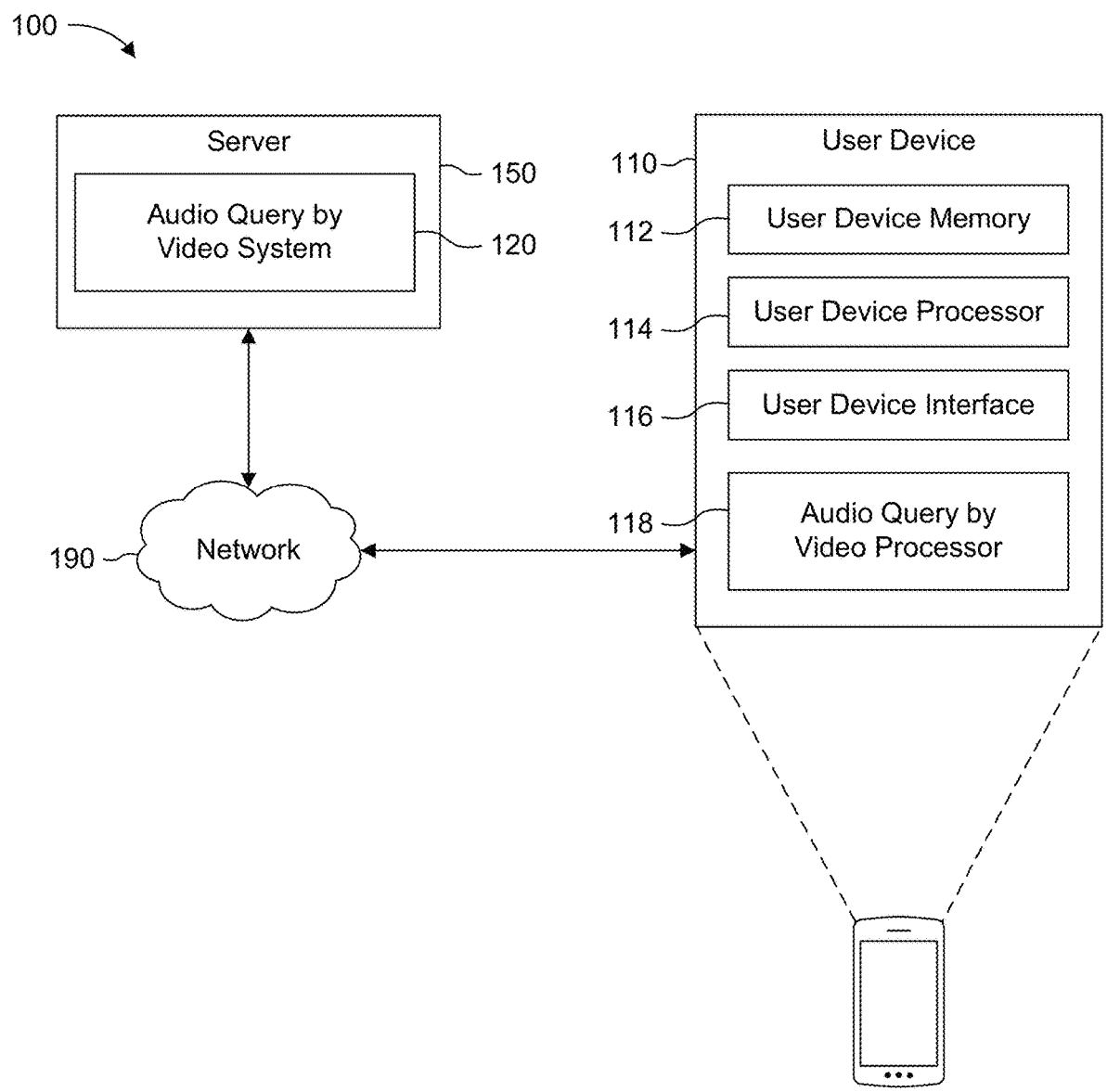
FIG. 1 illustrates an example environment for associating audio clips with video clips.

The example embodiments presented herein are directed to systems, methods, and non-transitory computer-readable medium products for associating and mixing audio content with a source video. This description is not intended to limit the application of the example embodiments presented herein. In fact, after reading the following description, it will be apparent to one skilled in the relevant art(s) how to implement the following example embodiments in alternative embodiments, such as a dedicated hardware device, and/or involving different modalities (e.g., text, images or audio). Aspects of the embodiments herein can also be used for different applications including, for example, generating playlists and/or retrieving new media content items to be paired with an input media content item of a different modality.

In an example embodiment, a system is provided that allows a user to associate a video clip with an audio clip based on latent emotion. In use, a user may upload a video clip having an emotion and is provided with an output including the video clip and an associated audio clip that has a corresponding emotion. The emotion of the uploaded video clip and the associated audio clips are automatically determined.

In another example embodiment there is provided a method of associating at least one media content clip with another media content clip where the media content clips have different modalities (e.g., images, video or audio). First embedding vectors of media content items of a first modality are determined. In turn, a media content clip of a second modality is received. A second embedding vector of the media content clip of the second modality is determined. The first embedding vectors are ranked based on a distance between the plurality of first embedding vectors and the second embedding vector. One or more of the media content items of the first modality are selected based on the ranking.

In one use case, an audio clip is synchronized to a video clip. In another use case, the audio clip is associated with a video clip, such as an image, so that when the image is selected the audio clip is played while viewing the image. The audiovisual combination can, in turn, be uploaded or otherwise communicated to a social media platform or other application.

Reference to various embodiments does not limit the scope of the claims attached hereto. Additionally, any examples set forth in this specification are not intended to be limiting and merely set forth some of the many possible embodiments for the appended claims.

When training a model, audio content items are automatically classified with an emotion tag, and video content items are also automatically classified with an emotion tag. An emotion tag represents an emotion detected in the content piece (e.g., the audio content piece, the video content piece, etc.). Such emotion tags can be automatically detected using now known or future known mechanisms for detecting emotions or input manually. Types of emotions and an example process for tagging each content piece to an emotion are described in more detail below. Tagged content items are stored in corresponding databases, e.g., a tagged audio content database that stores tagged audio content items and a tagged video content database that stores tagged video content items. In some embodiments, one or more audio content items are selected from a database of audio content items based on having a similar embedding vector to that of the video content. An emotion tag is associated with an audio content piece independently of an emotion tag that is associated with the video content piece. Once the model is trained, each branch predicts an embedding independently for each modality, otherwise known as a latent emotion space, which does not have any interpretable emotion.

In some embodiments, media content clips can include audio and video content. Audio content is content of an auditory modality. Examples of audio content include music (e.g., songs). Audio content can also include albums, playlists, radio stations, podcasts, audiobooks, and other audible media content items. Video content is content of a visual modality. Examples of video content include movies, music videos, television programs, and other visible media content items. Video content can also include still content, such as a photo, or a single frame of a video. In many cases, video content also includes audio content; however, the original audio content associated with video content is not used in the system described herein. Sometimes video content that incudes audio content is referred to as audiovisual content.

FIG. 1 illustrates an example system 100 that is useable to pair audio content items with video content items. The output of system 100 includes what is herein referred to as an audio-video pairing. The system 100 includes a user device 110 having at least one hardware connected to a server 150 having at least one hardware processor via a network 190. Although each depicted component of the system 100 will be described, every component is not necessarily needed for every embodiment of the present disclosure.

User device 110 is a computing device, such as a handheld entertainment device, smartphone, tablet, watch, wearable device, in-dash vehicle head unit, an aftermarket vehicle media playback appliance, a smart assistant device, a smart speaker, a smart home device, a television, a gaming console, a set-top box, a network appliance, a media player, a stereo system, an Internet-of-things device, or a radio, among other devices or systems. In some embodiments, user device 110 includes a user device memory 112, a user device processor 114, a user device interface 116, and an audio query by video processor 118.

It should be appreciated that a user device 110 need not be a single physical unit or structure but could itself comprise a system of interconnected hardware, firmware, and software. Thus, for example, user device 110 corresponds to a combination of a smart phone or specialized hand-held device that is connected (through a hardwire connection or wireless connection) to one or more speakers (e.g., a smart speaker, or through a media system of an automobile). In other examples, user device 110 is communicatively linked or linkable to hardware in another user environment such as a home, an office, another vehicle and the like. Thus it should be understood that user device 110 can be communicatively coupled to any system that provides media content playback.

The user device memory 112 is one or a collection of components of the user device 110 that stores data. The data can include computer-readable instructions, data structures, and program modules. The computer-readable instructions can include instructions that when executed by one or more processors, cause the one or more processors to perform one or more of the operations described herein. Examples of user device memory 112 include non-transitory computer-readable media (e.g., memory accessible by the user device processor 114). Examples of user device memory 112 include memory based on magnetic-storage technology (e.g., hard disk drives), optical-storage technology (e.g., optical discs), read-only memory technology (e.g., EEPROM memory), and random-access-memory technology (e.g., flash memory), among other technology.

The user device processor 114 is one or more processing units, such as central processing units (CPU), digital signal processors, and field-programmable gate arrays, among others. The user device processor 114 is capable of executing instructions (e.g., instructions stored by the user device memory 112) to cause performance of operations (such as the processes described herein).

The user device interface 116 is one or more components of user device 110 by which user device 110 can interact with the user or another device. In some examples, user device interface 116 includes a human-machine interface by which user device 110 receives input from or provides output to a user. For instance, the human-machine interface can include: a touch-based user interface (e.g., a touch screen for providing visual output to a user and receiving touch input from a user), an utterance-based user interface (e.g., a microphone for receiving voice input from a user and a speaker for providing synthesized voice output to the user), a hardware-button-based user interface (e.g., a hardware keyboard), a cursor-based user interface (e.g., a mouse or other pointing device), a tracking-based user interface (e.g., tracking device that tracks a hand, finger, eye, or wand), other user interfaces, or combinations thereof, and the user device 110 plays a media content item based thereon. The user device interface 116 can further include one or more components for communicating with another device, such as a wired (e.g., via Ethernet) or wireless (e.g., via a radiofrequency protocol, such as a cellular, BLUETOOTH, or WI-FI protocol) connection.

User device interface 116 can further include a content output device operative to provide audio output. Examples of the content output device include a speaker assembly having one or more speakers, an audio output jack, a wireless transmitter (e.g., a BLUETOOTH transmitter), a display panel, and a video output jack. Other examples are possible as well, such as transmitting a signal through the audio output jack or wireless transmitter to reproduce an audio signal by a connected or paired device such as headphones, speaker system, or vehicle head unit.

Audio query by video processor 118 is configured to receive an input as a video clip. Audio query by video processor 118 is also configured to associate an audio clip with the video clip. The audio query by video processor 118 can communicate with audio data store 122, video data store 124, and/or tagger 128 located at server 150, which is further described below in connection with FIG. 2.

In some embodiments, audio query by video processor 118 is a first audio query by video processor 118 that is configured to communicate with an audio query by video system 120, which is also referred to sometimes as second audio query by video system 120. In some embodiments, audio query by video system 120 is located at the server 150.

Generally, the audio query by video processor 118 receives a video clip, processes the video clip, and in turn assigns the video clip with an embedding vector. The user device 110 captures a video clip, such as by a user using the user device 110 to take a picture. Alternatively, a video clip may be retrieved from a video data store 124 via the user device 110. An embedding vector of the video clip is provided by the emotion feature extracting unit 126 and the tagger 128 of the audio query by video system 120 applies an embedding vector to the video clip. One or more audio clips are assigned a rank, where the rank is based on a distance between the audio clip embedding vector and the embedding vector of the video clip. The audio clips with a closest distance are selected by an audio data store 122 by audio query by video processor 118 and/or the audio query by video system 120, which in turn generates an output including both the video clip and at least one of the audio clips.

Server 150 is a computing device that provides services for other computing devices. In the illustrated example, the server 150 includes components that provide services to the user device 110 for operating the audio query by video system 120. In some examples, the server 150 is operated or provided by a virtual assistant service. Server 150 can provide other services as well. In some example embodiments, server 150 is provided by a subscription-based media streaming service to which a user may have an account. In other example embodiments, server 150 is operated by the subscription-based media streaming service.

In some instances, server 150 includes multiple server devices. The multiple server devices can be owned, managed, and/or controlled by separate entities. Various actions performed by one or more servers can include analyzing user communications, performing party-specific actions, accessing and/or transmitting media content, and the like. That first server can determine whether certain communications relate to third party software and can transmit those communications to a second server that is specific to the third party software.

Network 190 is an electronic communication network that supports communication between user device 110 and server 150. In some embodiments, network 190 includes a set of computing devices and links between the computing devices. Such computing devices can use the links to enable communication among the computing devices in network 190. Network 190 also can include components, such as routers and other types of computing devices. In various examples, network 190 includes various types of links. For example, network 190 can include wired and wireless links. Furthermore, in various examples, network 190 is implemented at various scales (e.g., as a local area network or a wide area network, such as the internet).

In some examples server 150 is or is part of a media-delivery system that streams, progressively downloads, or otherwise communicates music, other audio, video, or other forms of media content items to user device 110 for later playback. User device interface 116 can be configured to receive a user request to, for example, select media content for playback on user device 110.

In an example embodiment, the system is built on deep learning techniques and includes three components: a video emotion recognition network, an audio emotion recognition network, and a cross-modal distance-learning network. After the system is trained, audio samples from the database are collected and fed to the audio emotion recognition network to get the representation on the embedding space for each sample. During the query, the given video is fed to the video emotion recognition network to get the representation on the same embedding space. Then, a list of similar music can be retrieved.

Figure 2:
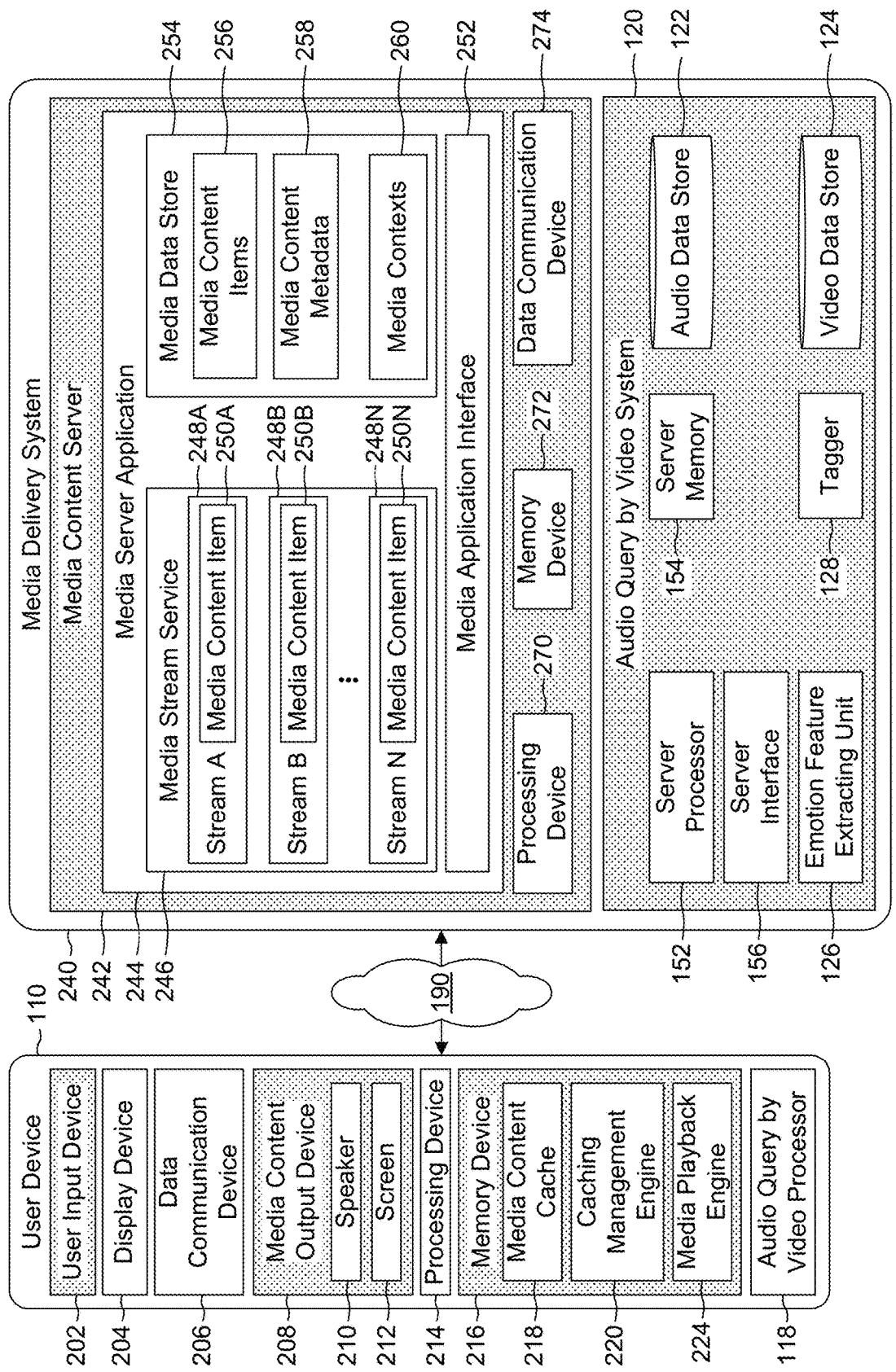
FIG. 2 is a block diagram of an example embodiment of a media playback device shown in FIG. 1.

FIG. 2 is a block diagram of an example embodiment of the user device 110 of the system 100 shown in FIG. 1. In this example, the user device 110 includes a user input device 202, a display device 204, a wireless data communication device 206, a media content output device 208, a processing device 214, and a memory device 216.

The user device 110 operates to take still pictures, view and/or play video media content, and play media content. For example, the user device 110 is configured to play media content that is provided (e.g., streamed or transmitted) by a system external to the user device 110, such as the media delivery system 240, another system, or a peer device. In other examples, the user device 110 operates to play video and/or audio content stored locally on the user device 110. In yet other examples, the user device 110 operates to play video and/or audio content that is stored locally as well as media content provided by other systems.

In some embodiments, the user device 110 is a handheld or portable entertainment device, smartphone, tablet, watch, wearable device, or any other type of computing device capable of playing media content. In other embodiments, the user device 110 is a laptop computer, desktop computer, television, gaming console, set-top box, network appliance, Blu-ray® or DVD player, media player, stereo, or radio.

The user input device 202 operates to receive a user input from a user for controlling the user device 110. The user input can include a manual input, such as a request to take a photo, record a video, retrieve a photo or video, and/or retrieve audio content.

In some embodiments, the user input device 202 includes functionalities to receive inputs from one or more buttons, keys, touch levers, switches, and/or other mechanical input devices for receiving a manual input.

Referring still to FIG. 2, the display device 204 operates to display information to a user. Examples of such information include media content playback information, notifications, and other information. In some embodiments, the display device 204 is configured as a touch sensitive display. In some embodiments, the display device 204 operates as both a display device and a user input device. A touch sensitive display screen operates to detect inputs based on one or both of touches and near-touches. In some embodiments, the display screen displays a graphical user interface for interacting with the user device 110. Other embodiments of the display screen do not include a touch sensitive display screen. Some embodiments include a display device and one or more separate user interface devices. Further, some embodiments do not include a display device.

The wireless data communication device 206 operates to enable the user device 110 to communicate with one or more computing devices over one or more networks, such as the network 190. For example, the wireless data communication device 206 is configured to communicate with the media delivery system 240 and receive media content from the media delivery system 240 at least partially via the network 190. The wireless data communication device 206 can be a network interface of various types which connects the user device 110 to the network 190. Examples of the wireless data communication device 206 include wired network interfaces and wireless network interfaces. Wireless network interfaces includes infrared, BLUETOOTH® wireless technology, 802.11a/b/g/n/ac, and cellular or other radio frequency interfaces in at least some possible embodiments. Examples of cellular network technologies include LTE, WiMAX, UMTS, CDMA2000, GSM, cellular digital packet data (CDPD), and Mobitex.

The media content output device 208 operates to output media content, including both video and audio content. In some embodiments, the media content output device 208 generates the media output for the user. In some embodiments, the media content output device 208 includes one or more speakers 210, and one or more screens 212 which are incorporated in the user device 110.

The processing device 214, in some embodiments, comprises one or more central processing units (CPU). In other embodiments, the processing device 214 additionally or alternatively includes one or more digital signal processors, field-programmable gate arrays, or other electronic circuits.

The memory device 216 typically includes at least some form of computer-readable media. The memory device 216 can include at least one data storage device. Computer readable media includes any available media that can be accessed by the user device 110. By way of example, computer-readable media includes computer readable storage media and computer readable communication media.

Computer readable storage media includes volatile and nonvolatile, removable and non-removable media implemented in any device configured to store information such as computer readable instructions, data structures, program modules, or other data. Computer readable storage media includes, but is not limited to, random access memory, read only memory, electrically erasable programmable read only memory, flash memory and other memory technology, compact disc read only memory, Blu-ray® discs, digital versatile discs or other optical storage, magnetic storage devices, or any other medium that can be used to store the desired information and that can be accessed by the user device 110. In some embodiments, computer readable storage media is non-transitory computer readable storage media.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The memory device 216 operates to store data and instructions. In some embodiments, the memory device 216 stores instructions for a media content cache 218, a caching management engine 220, and a media playback engine 224.

Some embodiments of the memory device 216 include the media content cache 218. The media content cache 218 stores media content items, such as media content items that have been received from the media delivery system 240. The media content cache 218 can also store media content items that originate from the user device 110, such as photos or videos. The media content items stored in the media content cache 218 may be stored in an encrypted or unencrypted format. In some embodiments, the media content cache 218 also stores metadata about media content items such as title, artist name, album name, length, genre, mood, era, etc. The media content cache 218 can further store playback information about the media content items and/or other information associated with the media content items.

The caching management engine 220 is configured to receive and cache media content in the media content cache 218 and manage the media content stored in the media content cache 218. In some embodiments, when media content is streamed from the media delivery system 240, the caching management engine 220 operates to cache at least a portion of the media content into the media content cache 218. In other embodiments, the caching management engine 220 operates to cache at least a portion of media content into the media content cache 218 while online so that the cached media content is retrieved for playback while the user device 110 is offline.

The media playback engine 224 operates to play media content to a user. As described herein, the media playback engine 224 is configured to communicate with the media delivery system 240 to receive one or more media content items (e.g., through a media stream service 246). In other embodiments, the media playback engine 224 is configured to play media content that is locally stored in the user device 110.

In some embodiments, the media playback engine 224 operates to retrieve one or more media content items that are either locally stored in the user device 110 or remotely stored in the media delivery system 240. In some embodiments, the media playback engine 224 is configured to send a request to the media delivery system 240 for media content items and receive information about such media content items for playback.

The user device 110 also includes an audio query by video processor 118. The audio query by video processor 118 functions similar to the audio query by video system 120, which is described in more detail below.

Referring still to FIG. 2, the media delivery system 240 includes a media content server 242 and an audio query by video system 120.

The media delivery system 240 comprises one or more computing devices and provides media content to the user device 110 and, in some embodiments, other user devices as well. In addition, the media delivery system 240 interacts with the user device 110 to provide the user device 110 with various functionalities.

In at least some embodiments, the media server application 244 and the audio query by video system 120 are provided by separate computing devices. In other embodiments, the media server application 244 and the audio query by video system 120 are provided by the same computing device(s). Further, in some embodiments, at least one of the media server application 244 and the audio query by video system 120 are provided by multiple computing devices. For example, the media server application 244 and the audio query by video system 120 may be provided by multiple redundant servers located in multiple geographic locations.

Although FIG. 2 shows a media server application 244 and an audio query by video system 120, some embodiments include multiple media server applications and multiple audio query applications. In these embodiments, each of the multiple media server application 244 and the audio query by video system 120 may be identical or similar to the media server application 244 and the audio query by video system 120 respectively, as described herein, and may provide similar functionality with, for example, greater capacity and redundancy and/or services from multiple geographic locations. Alternatively, in these embodiments, some of the multiple media content servers and audio query servers, and/or the user command interpretation servers may perform specialized functions to provide specialized services. Various combinations thereof are possible as well.

The media content server 242 transmits streamed media to media playback devices such as the user device 110. In some embodiments, the media content server 242 includes a media server application 244, a processing device 270, a memory device 272, and a data communication device 274. The processing device 270 and the memory device 272 may be similar to the processing device 214 and the memory device 216, respectively, which have each been previously described. Therefore, the description of the processing device 270 and the memory device 272 are omitted for brevity purposes.

The data communication device 274 operates to communicate with other computing devices over one or more networks, such as the network 190. Examples of the data communication device include one or more wired network interfaces and wireless network interfaces. Examples of such wireless network interfaces of the data communication device 274 include wireless wide area network (WWAN) interfaces (including cellular networks) and wireless local area network (WLANs) interfaces. In other examples, other types of wireless interfaces can be used for the data communication device 274.

In some embodiments, the media server application 244 is configured to stream media content, such as music or other audio, video, or other suitable forms of media content. The media server application 244 includes a media stream service 246, a media application interface 252, and a media data store 254. The media stream service 246 operates to buffer media content, such as media content items 248A, 248B, and 248N (collectively media content item(s) 248), for streaming to one or more media streams 250A, 2506, and 250N (collectively media stream(s) 250).

The media application interface 252 can receive requests or other communication from user devices or other systems, such as the user device 110, to retrieve media content items from the media content server 242. For example, in FIG. 2, the media application interface 252 receives communication from the user device 110 to receive media content from the media content server 242.

In some embodiments, the media data store 254 stores media content items 256, media content metadata 258, and media contexts 260. The media data store 254 may comprise one or more databases and file systems. Other embodiments are possible as well.

As described herein, the media content items 256 (including the media content items 248) may be audio, video, or any other type of media content, which may be stored in any format for storing media content. Further, media content items 248 may be a video-audio pair retrieved from the audio query by video system 120.

The media content metadata 258 provides various information associated with the media content items 256. In addition or alternatively, the media content metadata 258 provides various information associated with the media contexts 260. In some embodiments, the media content metadata 258 includes one or more of title, artist name, album name, length, genre, mood, era, emotion tag, embedding, etc.

The media content metadata 258 operates to provide various pieces of information (also referred to herein as attribute(s)) associated with the media content items 256 and/or the media contexts 260. In some embodiments, the media content metadata 258 includes one or more of title, artist name, album name, length, genre, mood, era, etc.

In some embodiments, the media content metadata 258 includes acoustic metadata, cultural metadata, and explicit metadata. The acoustic metadata may be derived from analysis of the track and refers to a numerical or mathematical representation of the sound of a track. Acoustic metadata may include temporal information such as tempo, rhythm, beats, downbeats, tatums, patterns, sections, or other structures. Acoustic metadata may also include spectral information such as melody, pitch, harmony, timbre, chroma, loudness, vocalness, or other possible features. Acoustic metadata may take the form of one or more vectors, matrices, lists, tables, and other data structures. Acoustic metadata may be derived from analysis of the music signal. One form of acoustic metadata, commonly termed an acoustic fingerprint, may uniquely identify a specific track. Other forms of acoustic metadata may be formed by compressing the content of a track while retaining some or all of its musical characteristics.

The cultural metadata refers to text-based information describing listeners' reactions to a track or song, such as styles, genres, moods, themes, similar artists and/or songs, rankings, etc. Cultural metadata may be derived from expert opinion such as music reviews or classification of music into genres. Cultural metadata may be derived from listeners through websites, chatrooms, blogs, surveys, and the like. Cultural metadata may include sales data, shared collections, lists of favorite songs, and any text information that may be used to describe, rank, or interpret music. Cultural metadata may also be generated by a community of listeners and automatically retrieved from Internet sites, chat rooms, blogs, and the like. Cultural metadata may take the form of one or more vectors, matrices, lists, tables, and other data structures. A form of cultural metadata particularly useful for comparing music is a description vector. A description vector is a multi-dimensional vector associated with a track, album, or artist. Each term of the description vector indicates the probability that a corresponding word or phrase would be used to describe the associated track, album or artist.

The explicit metadata refers to factual or explicit information relating to music. Explicit metadata may include album and song titles, artist and composer names, other credits, album cover art, publisher name and product number, and other information. Explicit metadata is generally not derived from the music itself or from the reactions or opinions of listeners.

At least some of the media content metadata 258, such as explicit metadata (names, credits, product numbers, etc.) and cultural metadata (styles, genres, moods, themes, similar artists and/or songs, rankings, etc.), for a large library of songs or tracks can be evaluated and provided by one or more third party service providers. Acoustic and cultural metadata may take the form of parameters, lists, matrices, vectors, and other data structures. Acoustic and cultural metadata may be stored as XML files, for example, or any other appropriate file type. Explicit metadata may include numerical, text, pictorial, and other information. Explicit metadata may also be stored in an XML or other file. All or portions of the metadata may be stored in separate files associated with specific tracks. All or portions of the metadata, such as acoustic fingerprints and/or description vectors, may be stored in a searchable data structure, such as a k-D tree or other database format.

Referring still to FIG. 2, each of the media contexts 260 is used to identify one or more media content items 256. In some embodiments, the media contexts 260 are configured to group one or more media content items 256 and provide a particular context to the group of media content items 256. Some examples of the media contexts 260 include albums, artists, playlists, and individual media content items. By way of example, where a media context 260 is an album, the media context 260 can represent that the media content items 256 identified by the media context 260 are associated with that album.

The audio query by video system 120 includes a server processor 152, a server memory 154, a server interface 156, an audio data store 122, and a video data store 124. The server processor 152, the server memory 154, the server interface 156 are respectively processor, memory, and interface components of the server and can each share attributes with their counterpart components of the user device 110. Although the figure illustrates the various components as being within a single audio query by video system 120, they need not be. The various components can be spread across multiple virtual or physical devices to provide the described capabilities.

The audio query by video system 120 receives video clips and audio clips separately, and predicts an embedding associated with each media clip as described in more detail below in connection with FIG. 3. An embedding is a dense representation of the input modality. In some embodiments, a network is constrained by emotion tags, such that the embeddings represent, generally, a rich combination of emotions corresponding to the input.

The embeddings are determined by the emotion feature extracting unit (EFEU) 126. EFEU 126 processes the video and/or audio clip to extract one or more embeddings from the audio and/or video clip. Embeddings correspond to emotion features that can be extracted from the textual component of the audio clip, i.e., the words that the user chose to use, and/or from a non-textual component of the audio clip, such as volume, pitch, pace, cadence, inflection, etc.

After an embedding is determined for each of the video and/or audio clips, a tagger 128 maps the appropriate embedding vector to each of the video and/or audio clips. The tagger 128 communicates with the audio query by video system 120, the audio data store 122, and/or the video data store 124 to correctly provide each clip with an embedding vector.

The audio data store 122 is a data store that stores data regarding audio content items, such as tracks. In some examples, the audio data store 122 stores data for each of a plurality of audio content items in a data structure (e.g., record of a table or other data structure) associated with each audio content item. An example audio content item data structure of the audio data store 122 stores data regarding a particular audio content item in one or more fields, such as an ID field (e.g., storing an identifier of the audio content item data structure), a title field (e.g., storing a title of the audio content item data structure, such as a song title), a content field (e.g., storing the content of the media content item or a link to the content of the audio content item data structure, such as the audio content of a song), and an audio fingerprint field. In some examples, the audio content item data structure further stores metadata for the track. The audio content item data structure need not store the entire media content item, and can store portions of the audio content item.

The video data store 124 is a data store that stores data regarding video content items, such as videos or pictures. In some examples, the video data store 124 stores data for each of a plurality of video content items in a data structure (e.g., record of a table or other data structure) associated with each video content item. An example video content item data structure of the video data store 124 stores data regarding a particular video content item in one or more fields, such as an ID field (e.g., storing an identifier of the video content item data structure), a title field (e.g., storing a title of the video content item data structure, such as a song title), a content field (e.g., storing the content of the video content item or a link to the content of the video content item data structure), and a video fingerprint field. In some examples, the video content item data structure further stores metadata for the video clip. The video content item data structure need not store the entire video content item, and can store portions of the video content item.

Figure 3:
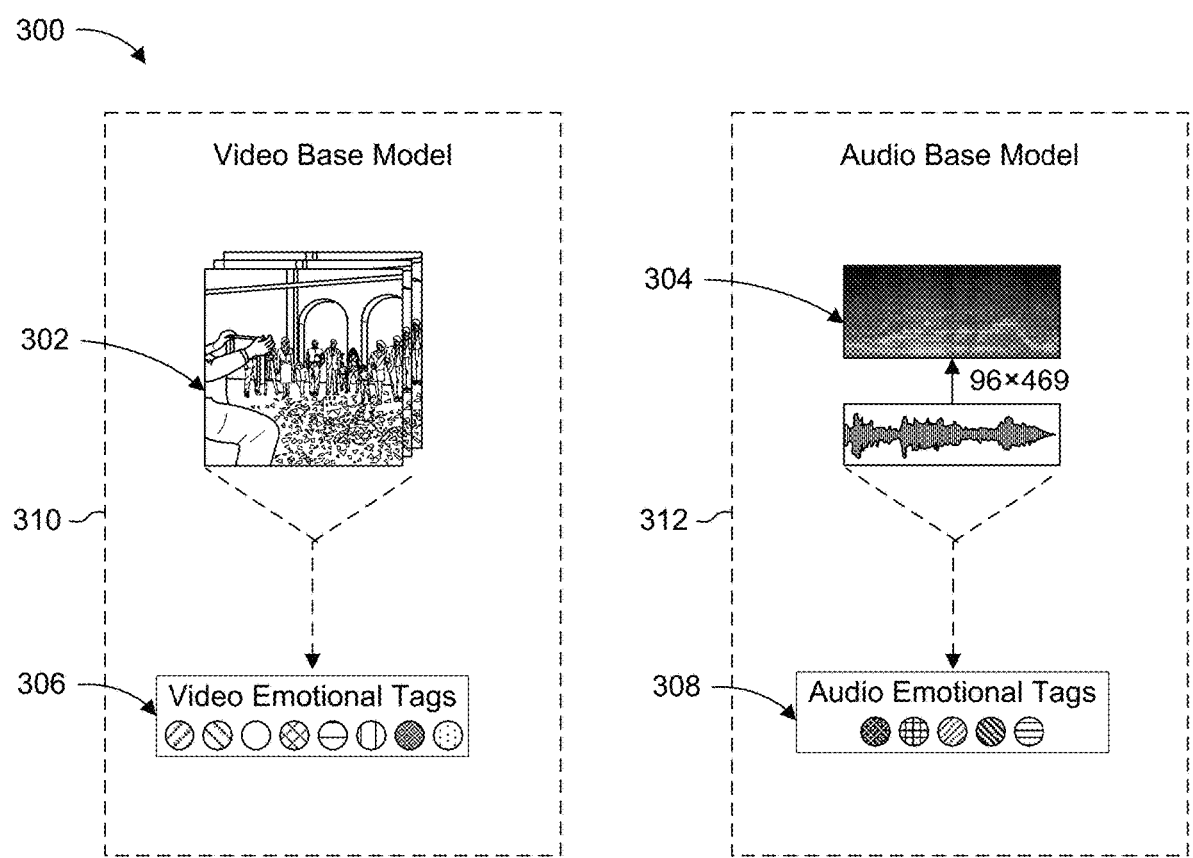
FIG. 3 illustrates an example method for training a system to determine emotion tags for audio clips and video clips.

FIG. 3 shows a network architecture 300 having two separate streams used to train a model. Each stream is trained individually to assign an emotion tag to an input. The architecture includes two separate streams: a video base model 310 stream to parse the video input to learn the emotional tagging task and an audio base model 312 stream to parse the audio input to learn the emotional tagging task.

The audio clip 304 is passed to audio base model 312. To train the model, the audio base model 312 receives the audio clip 304 and computes a log mel spectrogram based on the audio waveform contained within audio clip 304. A log mel spectrogram is a representation of the short-term power spectrum of a sound, based on a nonlinear mel scale of frequency. In some embodiments, the log mel spectrogram is represented as a 2D feature map, where one dimension represents time, the other dimension represents frequency, and the values represent amplitude.

In some embodiments, audio base model 312 is a convolutional neural network structure. A convolution neural network is used to analyze visual imagery in previous work in the computer vision field, and is used by the tagger 128 to determine what emotion representation (e.g., a tag or an embedding) is associated with each of the video clips. The convolution neural network, in turn, processes the log mel spectrogram to assign it weights and biases to differentiate one audio clip from another. Specifically, speech and non-speech sounds contained in each audio clip 304 are recognized and are used to determine which emotion is most closely related to the audio clip 304.

In some embodiments, the audio base model 312 recognizes emotion from speech sounds and non-speech sounds to predict emotion tags. The audio containing any one of speech sounds, non-speech sounds or a combination of speech sounds and non-speech sounds is received. This is accomplished by binning the audio spectrum into approximate mel frequency spacing widths to allow the spectral information to be used in about the same way as human hearing. The log mel spectrogram is in turn used to impute the received audio into the audio base model 312. The mel spectrogram is inputted into a neural network. The neural network outputs embeddings including a deep emotion embedding for cross-modal retrieval.

A convolutional neural network is generally used for predicting embeddings for a media content clip, such as an audio clip and/or a media clip. The convolution neural network consists of five convolutional blocks, each contains a batch normalization layer, a ReLU activation layer, a convolutional layer, and followed by a max-pool layer. The convolutional layers all have the kernel size as three-by-three, and different channel numbers as 64, 128, 128, 128, 64 for the five blocks respectively. On top there is a 256-D fully connected layer to represent the 256-D latent motion space, and a 7-D fully connected layer to output the final seven emotion tags from the 256-D latent emotion space In an example embodiment, audio base model 312 is a convolutional network structure followed by a number of fully-connected layers to formulate a multi-label classification problem. Given an audio clip 304 input, the model is able to output the likelihood of, for example, seven different audio emotion tags 308.

At the same time or a different time, but separately, the video emotion recognition network (also referred to herein as the video base model 310) receives a video clip 302 consisting of the feature extraction module and connected layers which allows it to learn emotional representations. These two processes may be performed in parallel, but this is not required.

The video base model 310 is includes an inflated 3D convolutional network structure and a number of fully-connected layers to formulate a multi-label regression problem. Given a video clip 302 input, the model is able to output the likelihood of, for example, 27 different video emotion tags 306.

In an example implementation, the inflated 3D convolutional network structure of the video base model 310 can be pre-trained on the kinetics data set with more than 200,000 training videos and 400 classes of human actions. Thus in some embodiments, the inflated 3D convolutional network structure can be pre-trained on different tasks for the purpose of human action recognition (or HAR). For example, in some embodiments, the dataset has 400 labels associated with human actions, such as "running," "walking," "eating," "drinking," "playing violin," and the like. The inflated 3D convolutional network structure is able to learn seamless spatial-temporal feature extractions from the video clips 302. After a global average pool, a 1024-D feature representation for each video clip 302 is created. Then several fully connected layers are added to the video with the ground-truth emotion tags built into the video emotion taking model. Each layer is followed by a rectifier linear unit (ReLU) non-linearity, except the output layer is followed by a sigmoid non-linearity.

The video clips 302 used to train the model may be resized as needed to fit a specified frame size by, for example, scaling the input image using, for example, now known or future developed computer vision methods. These video clips may also have their raw RGB values normalized in the range of −1 to 1.

Figure 4:
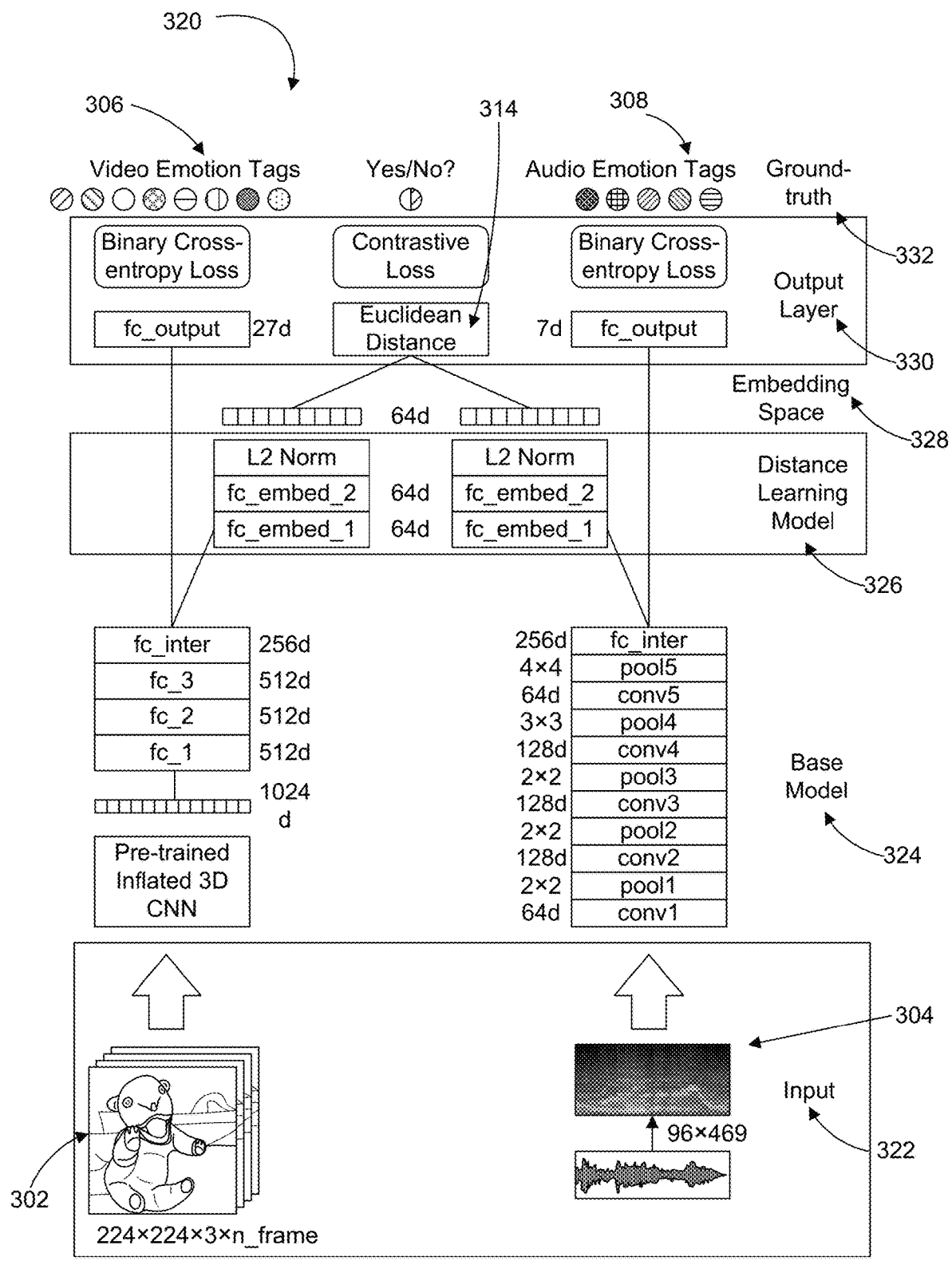
FIG. 4 illustrates another example method for training a system to determine the cross-modal distance of the audio clips and the video clips.

FIG. 4 illustrates an architecture 320 used to train the two-stream model, while also predicting embeddings. The architecture 320 includes input layer 322 including an audio clip 304 and a video clip 302. The base model 324 is capable of parsing the video clip 302 to learn the emotional tagging task and parsing the audio clip 304 to learn the emotional tagging task. The architecture 320 also includes a distance learning model 326. The distance learning model 326 takes the learned embeddings to output if the video clip and the audio clip are related in terms of emotion. The base model 324 functions as described above with regard to FIG. 3.

The distance learning model 326 is constructed to rank media content clips based on a distance between embedding vectors. The architecture includes two separate streams: the base model 324 stream to parse the video clip 302 to learn the emotional tagging task and the base model 324 stream to parse the audio clip 304 to learn the emotional tagging task. Based on the emotional tags associated with each of the video clip 302 and the audio clip 304, an embedding space 328 assigns embeddings.

The distance learning model 326 produces aligned video and audio embeddings for similarity. Distance learning model 326 includes several fully connected layers that take two 256-dimensional ("D") intermediate layers from the video and audio base networks and generates a 64-D embedding after L2 normalization. The 256-D embeddings from each model are used as input into a cross-modal distance learning network that shrinks each 256-D embedding to a 64-D embedding via fully connected layers. The cross modal distance is learned between the two 64-D embeddings. The 256-D intermediate layer is defined as the latent emotion states. The output is a scalar value which is determined by calculating the Euclidean distance 314 between the two 64-D embeddings, which indicates the similarity between the video-audio pair.

The distance learning model 326 merges the audio emotion recognition network and the video emotion recognition network, takes the input as a pair of video and audio samples, and outputs a scalar. The scalar is an element that represents how likely the video-audio pair is related in terms of emotion. More specifically, the distance learning model 326 converts the input of the video and audio latent emotion space (the 256-D embedding) to a 64-D common embedding space. The similarity between the video-audio pair can be measured by calculating the Euclidean distance of the embedding space. An output is provided, which is a scalar value that indicates the similarity between the video-audio pair.

The embeddings are associated with vectors, and at the output layer 330, a Euclidean distance 314 between the vectors is calculated. The Euclidean distance 314 represents how closely related the audio clip 304 is to the video clip 302. Audio clips 304 and video clips 302 with a closest Euclidean distance 314 are associated, as eliciting similar emotional concepts.

The output layer 330 also works with the groundtruth layer 332 to assign emotional tags to each of the video clips 302 and the audio clips 304. This is described in more detail with regard to FIG. 3.

For example, a video clip 302 of a baby kitten is received or retrieved by the input layer 322. The base model 324 associates an embedding with the video clip. The embedding may represent a rich combination of an emotion, such as joy. At the same time, at least one audio clip 304 associated with an embedding that represents a rich combination of a similar emotion, such as happy, is retrieved. The embedding of the video clip and the embedding of the audio clip are provided to the distance learning model 326. A Euclidean distance 314 between the two embeddings is calculated and at the groundtruth layer 332, the scalar value is provided. In the example, since happy and joy are related emotions, the scalar value is predicted to be high. A high scalar value is a prediction that the audio-video pair of a video comprising a baby kitten and happy audio represents an accurate pairing.

Figure 5:
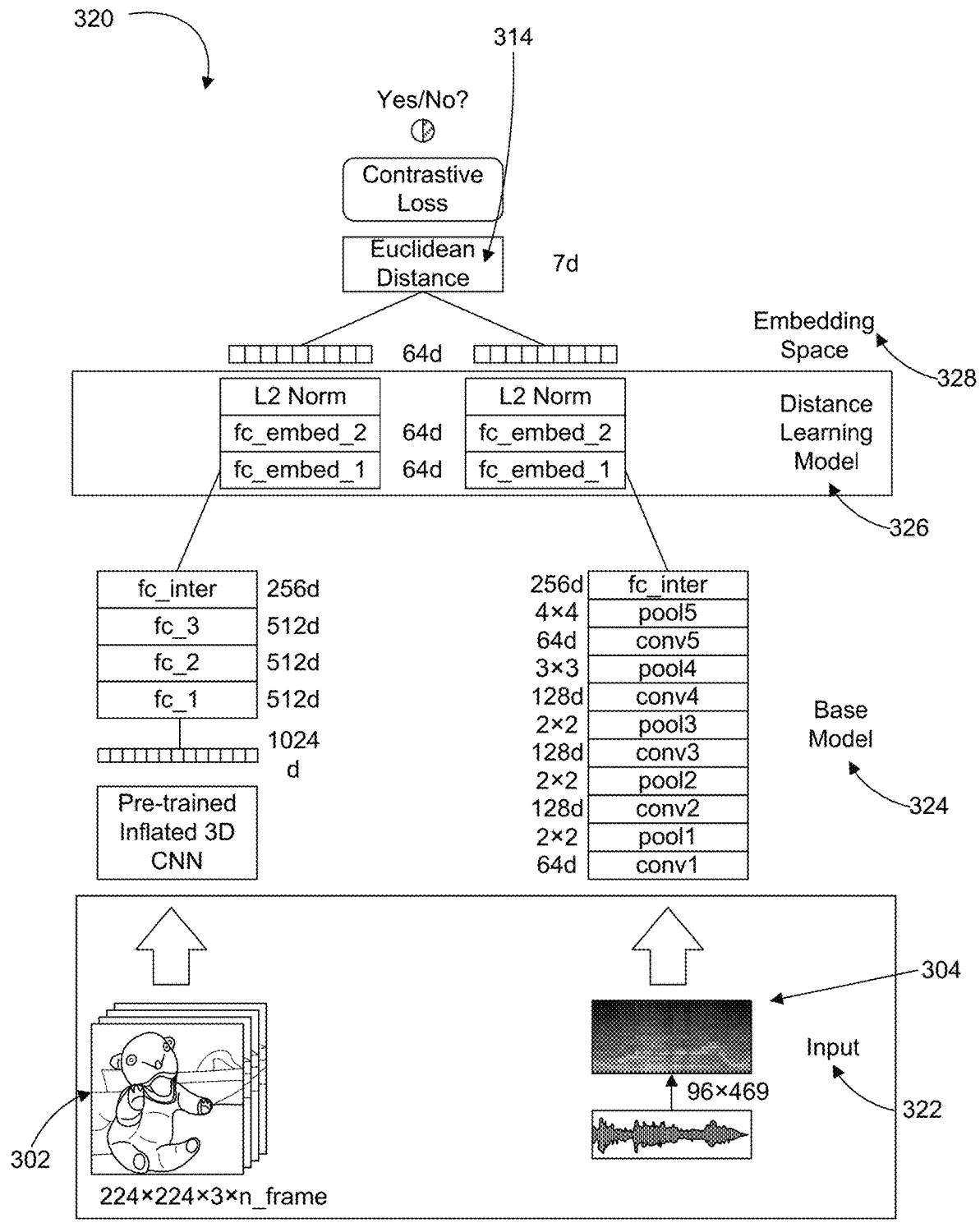
FIG. 5 illustrates an example method for using a system to associate a first media clip with a second media clip.

FIG. 5 illustrates an example model for use in determining a plurality of embedding vectors. The distance learning model 326 is constructed to rank media content clips based on a distance between embedding vectors. The video clip 302 is received at input layer 322 and passed to the base model 324, where an embedding is determined. The distance learning model 326 and the embedding space 328 are used to assign a first embedding vector. Audio clip 304 is also received at input layer 322 and passed to the base model 324, where an embedding is determined. The distance learning model 326 and the embedding space 328 are used to assign a first embedding vector.

The Euclidean distance 314 is calculated between each of the first embedding vector of the video clip 302 and the embedding vectors of all the audio clips 304. The audio clips 304 are ranked based on the Euclidean distance 314 to the vector of the video clip 302.

Figure 6:
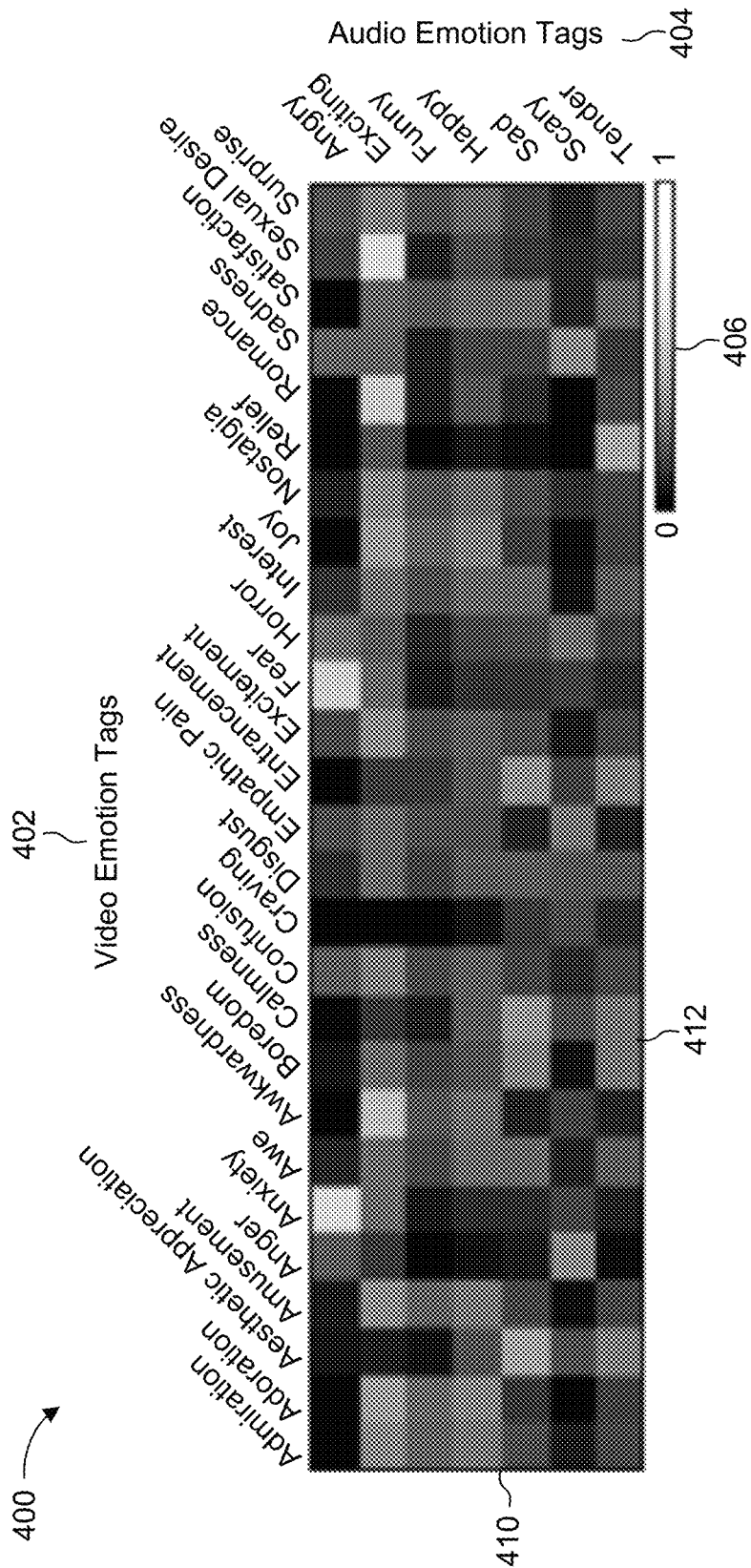
FIG. 6 illustrates an example heat map visualization of audio-video pairing results.

FIG. 6 illustrates an example visualization map 400 associating video emotion tags and audio emotion tags. This visualization map 400 shows a visualization of the video music pairing results from crowdsourced annotations with the independent emotion tags from the audio and video datasets. Sometimes this visualization is referred to as a heat map visualization.

To create the visualization map 400, pairs of audio clips and video clips are annotated until a predetermined number, e.g., 1500, of positive pairs exist. A positive pair is determined by, for example, playing back a video clip while listening to the audio clip. A positive pair is a pair of an audio clip and a video clip that has one or more emotion tags that match. In another embodiment, a positive pair is a pair of an audio clip and a video clip that have one or more emotion tags that are determined to be relatively close, by using for example a predetermined mapping of emotion tags. In yet another embodiment, a positive pair is a pair of an audio clip and a video clip that have been predetermined to match, by using for example crowdsource data that pairs media content items from different modalities. As shown in the example, there are 27 video emotion tags 402 and 7 audio emotion tags 404; however, more or less video emotion tags and/or audio emotion tags are envisioned. The video emotion tags 402 are selected from, for example: admiration, adoration, aesthetic appreciation, amusement, anger, anxiety, awe, awkwardness, boredom, calmness, confusion, craving, disgust, empathetic pain, entrancement, excitement, fear, horror, interest, joy, nostalgia, relief, romance, sadness, satisfaction, sexual desire, and surprise. The audio emotion tags 404 are selected from, for example: angry, exciting, funny, happy, sad, scary, and tender. It will be understood by those skilled in the art that media content items interpreted to contain different emotions can still be paired.

Visualization map 400 provides a scale 406 from 0 to 1 where "0" represents little or no correlation between emotion tags and "1" represents a high correlation between emotion tags. For clarity, the scale 406 is represented as differently shaded boxes. For example, an admiration video emotion tag representing the emotion admiration has a high correlation to a happy audio emotion tag representing the emotion happy, represented as square 410. It should be understood that such tags can be illustrated in a variety of different ways (e.g., as different shades of gray, different colors, or simply as different values). Whereas a video emotion tag of representing the emotion boredom has a low correlation to an audio emotion tag of tender, which is represented as square 412.

Figure 7:
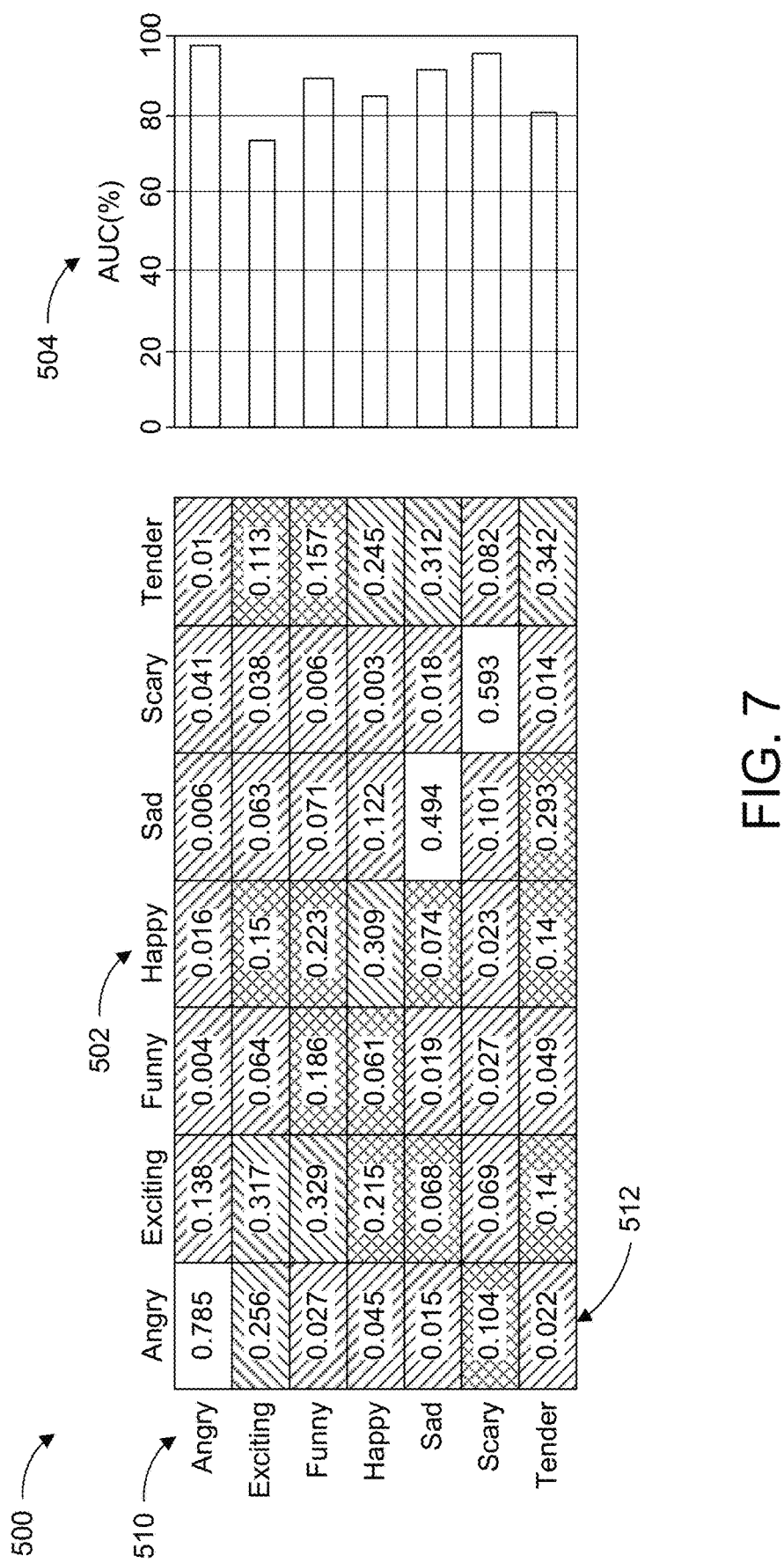
FIG. 7 illustrates an example audio emotion tagging results list.

FIG. 7 shows an example evaluation chart 500 representing the evaluation of audio emotion tagging results. The evaluation chart 500 includes a confusion matrix results chart 502 and an AUC category results chart 504. The confusion matrix results chart 502 includes rows 510 and columns 512 of emotions The accuracy of audio emotion tagging can be arranged in the confusion matrix results chart 502 as shown in FIG. 7. Each row represents the instances from the ground truth label and each column represents the instances from prediction. Each row is normalized with a unit song. As shown in the confusion matrix results chart 502, the emotions angry and scary are likely to get high true positive rate and the boundaries between exciting, funny, and happy are blurred. The confusion matrix results chart 502 suggests that angry music is always noisy with strong percussion sand scary music as strong inharmonicity, which gives them distinct characteristics to identify, whereas some samples from the exciting, funny, and happy music are not easy to distinguish even by humans.

The performance is then evaluated using an area under an ROC (receiver operating characteristic) curve (herein referred to as AUC). The results are shown as the AUC category results chart 504. This provides a simple statistical summary of the performance regardless of classification threshold. The AUC value is in the range of 0.5 to 1. A score of 0.5 represents a random guess and a score of 1 represents a perfect system. The audio emotion tagging branch has an AUC value of 87.88%.

Figure 8:
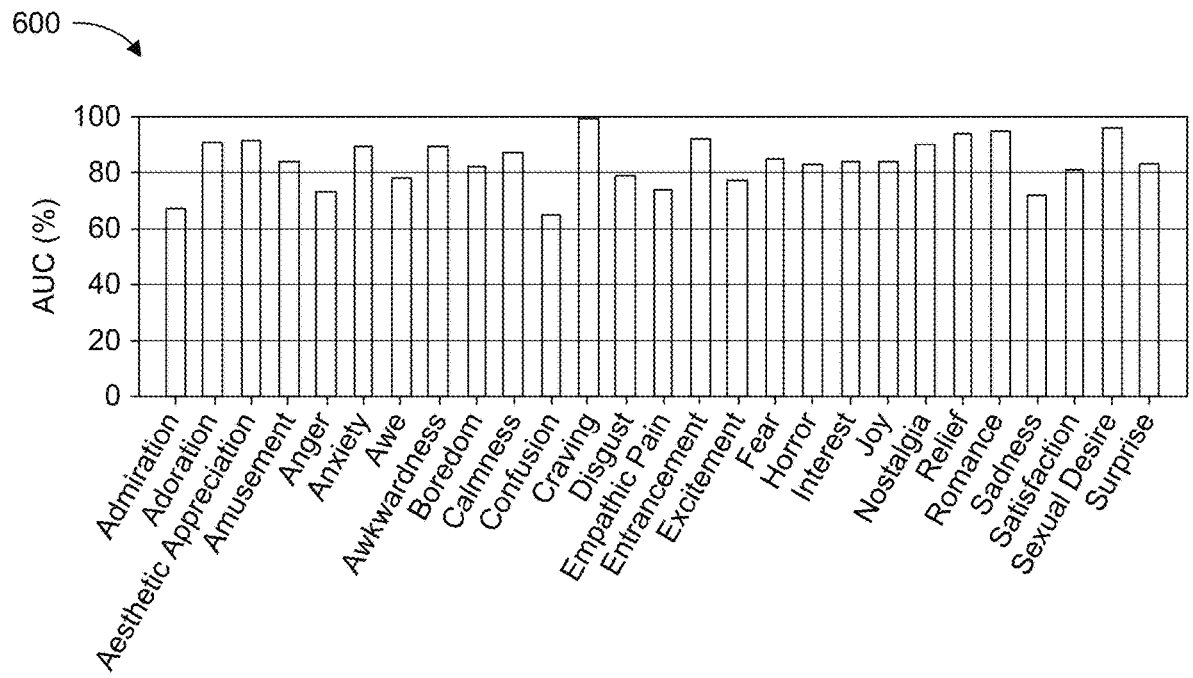
FIG. 8 illustrates an example video emotion tagging results graph.

FIG. 8 illustrates a qualitative visualization 600 of the video emotion tagging results. The emotion labels in the dataset for video emotion tagging have continuous values between 0 and 1, instead of binary values. While continuous values are not suitable for traditional AUC metrics that measure a multi-label classification problem, an AUC@th metric that treats soft labels as binary labels using different thresholds is able to determine values.

AUC is closely related to the "rank error" on a pair of positive-negative samples (e.g., a sample with label 1 and the other with label 0) comparing the model prediction with ground-truth (Gao and Zhou 2015).

To define positive and negative samples in terms of soft ground-truth labels, the threshold th to formulate pairs to calculate the ranking loss was controlled, i.e., only the pair whose ground-truth labels differs more than th are considered as a positive-negative pair. This can be calculated on each category independently, then averaged overall. Overall, the model has an AUC@th=0.25 (set threshold as 0.25) of 83.79% averaged on all the categories, and the result on each category is shown in FIG. 8. The threshold was varied from 0.1 to 0.5 (the larger threshold, the less samples to be considered to calculate) to evaluate the AUC.

FIG. 9 illustrates an example musical retrieval score chart 700 using social media query videos from different categories. The chart 700 shows example video clips and the accuracy of the model for retrieving appropriate audio clips. As a test, new sources of unconstrained, unlabeled video clips were retrieved from a social media platform. Evaluations were based on human judgement. For each audio-video pair a retrieval score was calculated, which was based on the percentage of query videos that the top retrieval musical was annotated as a match.

Figure 10:
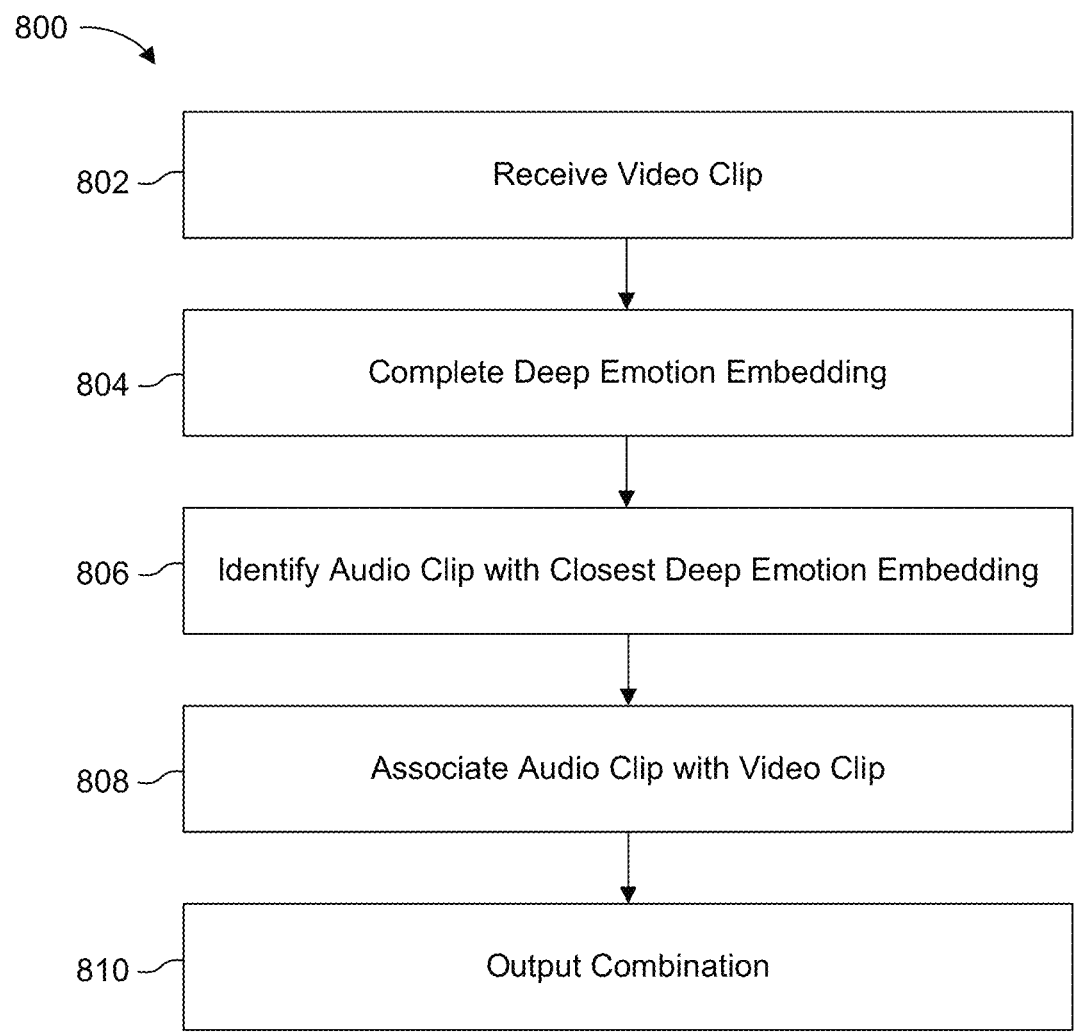
FIG. 10 illustrates an example method of generating an audio-video combination output.

FIG. 10 illustrates an example method 800 of generating an output combination in an example of associated at least one media content clip with another media content clip having a different modality. Specifically, method 800 describes the pairing of an audio clip 304 to a video clip 302.

Operation 802 includes receiving a video clip. The video clip may be a traditional video clip, an unconstrained video clip, or a photo. The video clip can be obtained in any of a variety of ways, such as from a program (e.g., a program operating on the user device 110) or a file path to the video clip. In some examples, the video clip is obtained using the identifier or file path. In some examples, the video clip is identified by the location of the video clip in the video data store. In some examples, the video clip itself is provided directly by the user.

The source video maybe an unconstrained video. An unconstrained video is a video selected from a broad resource with various durations. The video may be an informal video clip, abstract artistic work, or a still photo.

At operation 804, the embedding of the video clip is identified. A video clip may be tagged with one or more embeddings. The video clip may be tagged with each embedding using the processes described above in connection with FIGS. 2-9. Identifying the embedding of the video clip includes analyzing the video clip to determine, for example, which emotion may be elicited from a user or viewer of the clip.

At operation 806, at least one audio clip with a compatible embedding is identified. For ease of understanding, many example aspects of the embodiments described herein are described in relation to tracks as audio clips.

A track is an audio recording. Typically the audio recording is a recording of a piece of music (e.g., a song). Tracks are often associated with metadata. Metadata is data about data. With respect to media content, metadata is data that describes information about the media content item and/or the media content itself. For example, with regard to a track metadata, the metadata can contain information such as track length, track identifier (e.g., a unique identifier of the track), and track location (e.g., where it is stored).

Compatibility is defined at the closest distance between an embedding vector of a video clip and the embedding vector of an audio clip. After a video clip is uploaded, the system ranks the audio clips. The audio clips are ranked based on a distance between the embedding vector of the video clip and the embedding vector of the audio clip. The audio clips with the shortest vector distance to the video clip embedding vector are identified.

More than a single audio clip may be identified. In a first example, one audio clip with the shortest vector distance is identified. In another embodiment, the top five audio clips with the shortest vector distance are identified. The identified audio clips are presented to the user for selection.

In some examples, the audio clip is received from a user or a program (e.g., over an API) as an identifier of the audio clip (e.g., a unique identifier thereof) or a file path to the audio clip. In some examples, the audio clip is obtained using the identifier or file path. In some examples, the audio clip is identified by the location of the audio clip and receiving the audio clip includes obtaining the audio clip from the source. In some examples, the audio clip itself is provided directly. The track metadata can be obtained in a similar manner. For example, the track metadata can be received from a user or a program as an identifier of metadata, an identifier of the track (e.g., usable to look up the metadata in the media data store 254), or a path to a location storing metadata. In some examples, the metadata is provided directly.

At operation 808 the selected audio clip is associated with the video clip. This includes using the two-stream network architecture 300 to associate audio clips with video clips as shown in FIGS. 3-4, and using the scale 406 to determine the best pairing.

At operation 810 the combination audio clip and video clip is outputted to the user. The output includes a video-audio pairing based on a high likelihood that the video-audio pair is related in terms of emotion. Once the user receives the combination, the user is able to upload the combination to an application or social media platform.

In many examples, the audio output is formed from a combination of one or more audio snippets, such as audio snippets taken from tracks or other media content items. Where the audio snippets are taken from copyrighted media content items, the audio snippets can be used in accordance with relevant permission or license from the rights holder. In examples, the selection of tracks is performed as a selection of a plurality of tracks that have been licensed or are already available for this purpose.

In alternative embodiments, the method 800 may be used in a similar manner to associate a video clip with a provided audio clip.

Included in the programming and/or software of the system are software modules for implementing the procedures described above.

The operations and processes described herein can be performed by the cooperation of two or more devices, systems, processes, or combinations thereof. The various embodiments described above are provided by way of illustration only and should not be construed to limit the claims attached hereto. Those skilled in the art will readily recognize various modifications and changes that may be made without following the example embodiments and applications illustrated and described herein, and without departing from the full scope of the following claims.

What is claimed is:

1. A method of associating at least one media content clip with another media content clip having a different modality, the method comprising the steps of:
determining a plurality of first embedding vectors of a plurality of media content items of a first modality;
receiving a media content clip of a second modality, wherein the second modality is different than the first modality;
determining a second embedding vector of the media content clip of the second modality;
training a model by constraining a stream of video with a plurality of predetermined tags for the first modality and constraining a stream of audio with a plurality of predetermined tags for the second modality, wherein the one or more predetermined tags are used to represent an emotion;
ranking, using the model, the plurality of first embedding vectors based on a distance between the plurality of first embedding vectors and the second embedding vector;
selecting one or more of the plurality of media content items of the first modality based on the ranking;
presenting, via a user interface, the selected one or more of the plurality of media content items of the first modality;
receiving, via the user interface, a selected media content item from the one or more media content items of the first modality; and
providing an output including the media content clip of the second modality and the selected media content item from the one or more media content items of the first modality.

2. The method according to claim 1, wherein the first modality is an auditory modality and the second modality is a visual modality.

3. The method according to claim 2, wherein the audio modality is music.

4. The method according to claim 2, wherein the visual modality is obtained from any one of a movie, a television program, a photo, a single frame of a video, or a combination thereof.

5. The method according to claim 1, wherein the first modality is a visual modality and the second modality is an auditory modality.

6. The method according to claim 5, wherein the audio modality is music.

7. The method according to claim 5, wherein the visual modality is obtained from any one of a movie, a television program, a photo, a single frame of a video, or a combination thereof.

8. The method according to claim 1, wherein the emotion is selected from a set of predetermined emotions.

9. A system configured to associate at least one media content clip with another media content clip having a different modality, the system comprising:
a computing system including a programmable circuit operatively connected to a memory, the memory storing computer-executable instructions which, when executed by the programmable circuit, cause the computing system to:
determine a plurality of first embedding vectors of a plurality of media content items of a first modality;
receive a media content clip of a second modality, wherein the second modality is different than the first modality;
determine a second embedding vector of the media content clip of the second modality;
train a model by constraining a stream of video with a plurality of predetermined tags for the first modality and constraining a stream of audio with a plurality of predetermined tags for the second modality, wherein the one or more predetermined tags are used to represent an emotion;
rank, using the model, the plurality of first embedding vectors based on a distance between the plurality of first embedding vectors and the second embedding vector;
select one or more of the plurality of media content items of the first modality based on the ranking
present, via a user interface, the selected one or more of the plurality of media content items of the first modality to a user;
receive, via the user interface, a selected media content item from the one of more media content items of the first modality; and
provide an output including the media content clip of the second modality and the elected media content item from the one or more media content items of the first modality.

10. The system according to claim 9, wherein the first modality is an auditory modality and the second modality is a visual modality.

11. The system according to claim 10, wherein the audio modality is music.

12. The system according to claim 8, wherein the emotion is selected from a set of predetermined emotions.

13. The system according to claim 9, wherein the first modality is a visual modality and the second modality is an auditory modality.

14. The system according to claim 13, wherein the audio modality is music.

15. The system according to claim 10, wherein the visual modality is obtained from any one of a movie, a television program, a photo, a single frame of a video, or a combination thereof.

16. The system according to claim 13, wherein the visual modality is obtained from any one of a movie, a television program, a photo, a single frame of a video, or a combination thereof.

17. A non-transitory computer-readable medium having stored thereon one or more sequences of instructions for causing one or more processors to perform:
determining a plurality of first embedding vectors of a plurality of media content items of a first modality;
receiving a media content clip of a second modality, wherein the second modality is different than the first modality;
determining a second embedding vector of the media content clip of the second modality;
training a model by constraining a stream of video with a plurality of predetermined tags for the first modality and constraining a stream of audio with a plurality of predetermined tags for the second modality, wherein the one or more predetermined tags are used to represent an emotion;
ranking, using the model, the plurality of first embedding vectors based on a distance between the plurality of first embedding vectors and the second embedding vector;
selecting one or more of the plurality of media content items of the first modality based on the ranking;
presenting, via a user interface, the selected one or more of the plurality of media content items of the first modality;
receiving, via the user interface, an elected media content item of the first modality; and
providing an output including the media content clip of the second modality and the elected media content item of the first modality.

18. The non-transitory computer-readable medium of claim 17, wherein the first modality is an auditory modality and the second modality is a visual modality.

19. The non-transitory computer-readable medium of claim 18, wherein the audio modality is music and the visual modality is obtained from any one of a movie, a television program, a photo, a single frame of a video, or a combination thereof.

20. The non-transitory computer-readable medium of claim 17, wherein the emotion is selected from a set of predetermined emotions.

* * * * *

UNITED STATES PATENT AND TRADEMARK OFFICE
CERTIFICATE OF CORRECTION

PATENT NO. : 11,157,542 B2
APPLICATION NO. : 16/439626
DATED : October 26, 2021
INVENTOR(S) : Bochen Li Page 1 of 1

It is certified that error appears in the above-identified patent and that said Letters Patent is hereby corrected as shown below:

In the Specification

Column 10
Line 23, "2506" should read --250B--.

Column 13
Line 57, "space" should read --space.--.

Column 16
Line 48, "emotions" should read --emotions.--.

Column 20
Line 28, "one of more" should read --one or more--.

In the Claims

Column 20
Line 40, Claim 12, "claim 8," should read --claim 9,--.

Signed and Sealed this
Twenty-fifth Day of January, 2022

Drew Hirshfeld
*Performing the Functions and Duties of the*
*Under Secretary of Commerce for Intellectual Property and*
*Director of the United States Patent and Trademark Office*